United States Patent [19]

Suzuki et al.

[11] Patent Number: 5,973,698
[45] Date of Patent: Oct. 26, 1999

[54] METHOD AND SYSTEM FOR SORTING POLYGON DATA ACCORDING TO DEPTH VALUES

[75] Inventors: Masayuki Suzuki; Seisuke Morioka, both of Tokyo, Japan

[73] Assignee: Sega Enterprises, Ltd., Tokyo, Japan

[21] Appl. No.: 08/816,933

[22] Filed: Mar. 14, 1997

[30] Foreign Application Priority Data

Mar. 22, 1996 [JP] Japan .................................. 8-065902

[51] Int. Cl.$^6$ .................................................. G06T 17/00
[52] U.S. Cl. ............................................................ 345/418
[58] Field of Search .................................... 345/418–433

[56] References Cited

PUBLICATIONS

Foley et al. "Computer Graphics: Principles and Practice" Second Edition p. 673, 1990.

*Primary Examiner*—Almis R. Jankus
*Attorney, Agent, or Firm*—Dickstein Shapiro Morin & Oshinsky LLP

[57] ABSTRACT

A polygon data sorting method and a polygon data sorting system is disclosed where the required memory capacity is not affected by changes in target data. The method sorts polygon data stored in an arbitrary order in an increasing or decreasing direction of a reference value which may be the depth of the polygon, for example. The polygon data is rearranged using the order of the reference values as an arrangement standard and includes the steps of dividing the reference values of the plurality of polygon data sets into upper digits and lower digits, registering values for the upper digits in an increasing or decreasing direction, registering the values for the upper digits and values at corresponding lower digits, and registering index numbers indicating positions where the stored polygon data reside. The polygon data may then be read in an order represented by the index numbers that correspond to the increasing or descending order of the values for the upper digits that are registered.

9 Claims, 20 Drawing Sheets

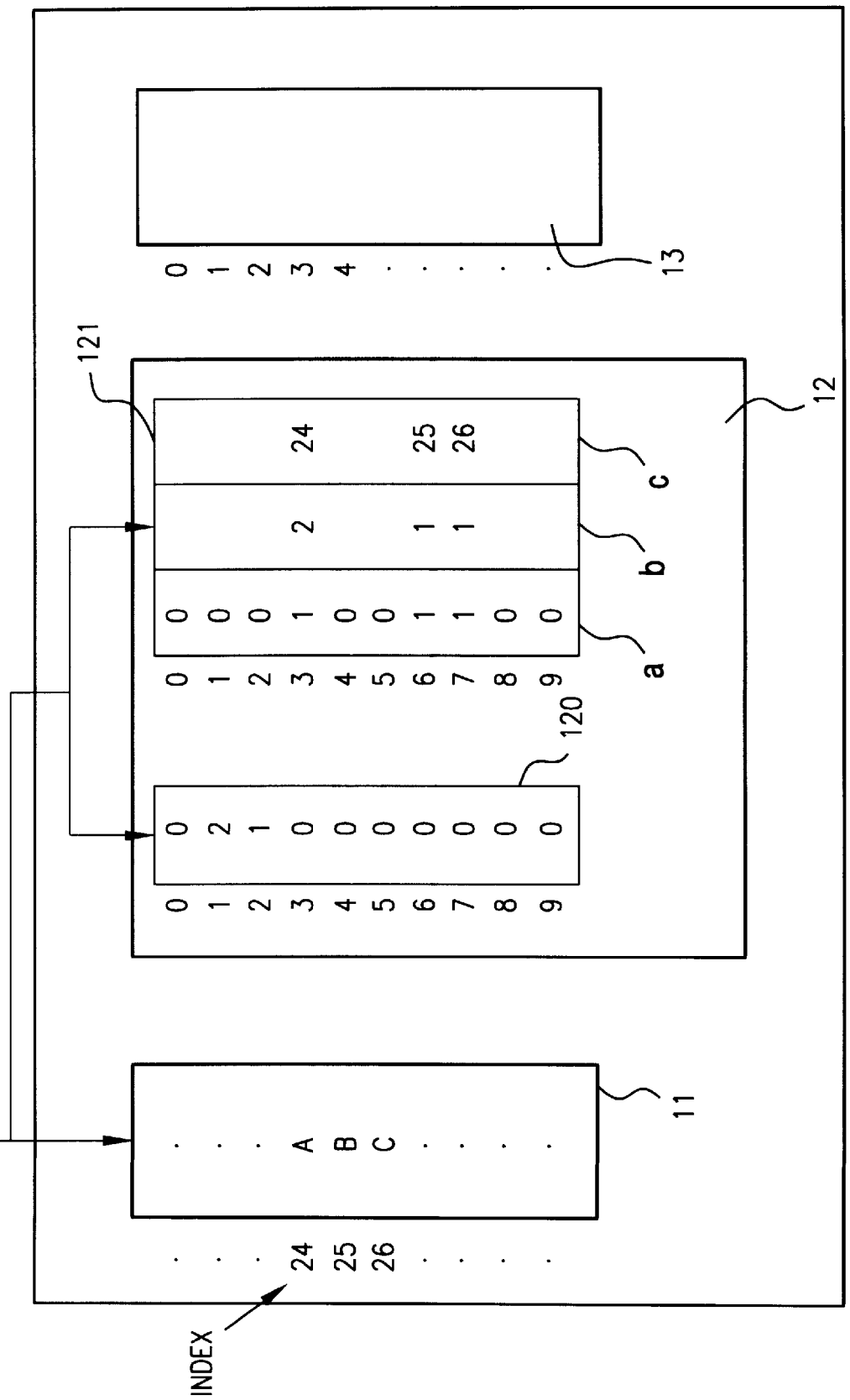

FIG. 8A

| | |
|---|---|
| 0 | 0 |
| 1 | 2 |
| 2 | 1 |
| 3 | 0 |
| 4 | 0 |
| 5 | 0 |
| 6 | 0 |
| 7 | 0 |
| 8 | 0 |
| 9 | 0 |

| | |
|---|---|
| 0 | 0 |
| 1 | 0 |
| 2 | 2 |
| 3 | 3 |
| 4 | 0 |
| 5 | 0 |
| 6 | 0 |
| 7 | 0 |
| 8 | 0 |
| 9 | 0 |

120'

| | | |
|---|---|---|
| 0 | A | (23) |
| 1 | B | (17) |
| 2 | C | (16) |
| 3 | D | (46) |
| 4 | E | (82) |
| 5 | F | (35) |
| 6 | G | (77) |
| 7 | H | (36) |
| 8 | I | (55) |
| 9 | J | (28) |
| 10 | K | (49) |
| 11 | L | (72) |
| 12 | M | (17) |
| 13 | N | (89) |
| 14 | O | (52) |
| 15 | P | (29) |
| 16 | Q | (66) |
| 17 | R | (39) |
| 18 | S | (71) |
| 19 | T | (34) |
| 20 | U | (57) |
| 21 | V | (62) |
| 22 | W | (33) |
| 23 | X | (33) |
| 24 | Y | (54) |
| 25 | Z | (28) |

11 a   b1 c1   b2 c2   b3 c3

121

| | |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |

120

| 0 | A | (23) |
| 1 | B | (17) |
| 2 | C | (16) |
| 3 | D | (46) |
| 4 | E | (82) |
| 5 | F | (35) |
| 6 | G | (77) |
| 7 | H | (36) |
| 8 | I | (55) |
| 9 | J | (28) |
| 10 | K | (49) |
| 11 | L | (72) |
| 12 | M | (17) |
| 13 | N | (89) |
| 14 | O | (52) |
| 15 | P | (29) |
| 16 | Q | (66) |
| 17 | R | (39) |
| 18 | S | (71) |
| 19 | T | (34) |
| 20 | U | (57) |
| 21 | V | (62) |
| 22 | W | (33) |
| 23 | X | (33) |
| 24 | Y | (54) |
| 25 | Z | (28) |

~11

| 0 | 0 |
| 1 | 0 |
| 2 | 1 |
| 3 | 0 |
| 4 | 0 |
| 5 | 0 |
| 6 | 0 |
| 7 | 0 |
| 8 | 0 |
| 9 | 0 |

| | | |
|---|---|---|
| 0 | A | (23) |
| 1 | B | (17) |
| 2 | C | (16) |
| 3 | D | (46) |
| 4 | E | (82) |
| 5 | F | (35) |
| 6 | G | (77) |
| 7 | H | (36) |
| 8 | I | (55) |
| 9 | J | (28) |
| 10 | K | (49) |
| 11 | L | (72) |
| 12 | M | (17) |
| 13 | N | (89) |
| 14 | O | (52) |
| 15 | P | (29) |
| 16 | Q | (66) |
| 17 | R | (39) |
| 18 | S | (71) |
| 19 | T | (34) |
| 20 | U | (57) |
| 21 | V | (62) |
| 22 | W | (33) |
| 23 | X | (33) |
| 24 | Y | (54) |
| 25 | Z | (28) |

| 0 | 0 |
|---|---|
| 1 | 2 |
| 2 | 1 |
| 3 | 0 |
| 4 | 1 |
| 5 | 0 |
| 6 | 0 |
| 7 | 0 |
| 8 | 0 |
| 9 | 0 |

| 0 | A | (23) |
|---|---|---|
| 1 | B | (17) |
| 2 | C | (16) |
| 3 | D | (46) |
| 4 | E | (82) |
| 5 | F | (35) |
| 6 | G | (77) |
| 7 | H | (36) |
| 8 | I | (55) |
| 9 | J | (28) |
| 10 | K | (49) |
| 11 | L | (72) |
| 12 | M | (17) |
| 13 | N | (89) |
| 14 | O | (52) |
| 15 | P | (29) |
| 16 | Q | (66) |
| 17 | R | (39) |
| 18 | S | (71) |
| 19 | T | (34) |
| 20 | U | (57) |
| 21 | V | (62) |
| 22 | W | (33) |
| 23 | X | (33) |
| 24 | Y | (54) |
| 25 | Z | (28) |

FIG. 14B

| | a | b1 | c1 | b2 | c2 | b3 | c3 |
|---|---|---|---|---|---|---|---|
| 0 | 0 | | | | | | |
| 1 | 0 | | | | | | |
| 2 | 2 | 8 | 4 | 7 | 11 | | |
| 3 | 1 | 2 | 0 | | | | |
| 4 | 0 | | | | | | |
| 5 | 2 | 3 | 5 | 5 | 8 | | |
| 6 | 2 | 1 | 2 | 4 | 3 | | |
| 7 | 3 | 1 | 1 | 7 | 6 | 3 | 7 |
| 8 | 2 | 2 | 9 | 1 | 12 | | |
| 9 | 1 | 4 | 10 | | | | |

| 0 | 0 |
|---|---|
| 1 | 3 |
| 2 | 2 |
| 3 | 2 |
| 4 | 2 |
| 5 | 1 |
| 6 | 0 |
| 7 | 2 |
| 8 | 1 |
| 9 | 0 |

| 0 | A | (23) |
| 1 | B | (17) |
| 2 | C | (16) |
| 3 | D | (46) |
| 4 | E | (82) |
| 5 | F | (35) |
| 6 | G | (77) |
| 7 | H | (36) |
| 8 | I | (55) |
| 9 | J | (28) |
| 10 | K | (49) |
| 11 | L | (72) |
| 12 | M | (17) |
| 13 | N | (89) |
| 14 | O | (52) |
| 15 | P | (29) |
| 16 | Q | (66) |
| 17 | R | (39) |
| 18 | S | (71) |
| 19 | T | (34) |
| 20 | U | (57) |
| 21 | V | (62) |
| 22 | W | (33) |
| 23 | X | (33) |
| 24 | Y | (54) |
| 25 | Z | (28) |

~11

| | a | b1 | c1 | b2 | c2 | b3 | c3 |
|---|---|---|---|---|---|---|---|
| 0 | 2 | 4 | 17 | 3 | 25 | | |
| 1 | 1 | 7 | 18 | | | | |
| 2 | 3 | 8 | 4 | 7 | 11 | 5 | 14 |
| 3 | 3 | 2 | 0 | 6 | 21 | 3 | 22 |
| 4 | 3 | 3 | 19 | 3 | 23 | 5 | 24 |
| 5 | 2 | 3 | 5 | 5 | 8 | | |
| 6 | 3 | 1 | 2 | 4 | 3 | 3 | 7 |
| 7 | 3 | 1 | 1 | 7 | 6 | 1 | 12 |
| 8 | 3 | 2 | 9 | 6 | 16 | 5 | 20 |
| 9 | 3 | 4 | 10 | 8 | 13 | 2 | 15 |

121

| 0 | 0 |
| 1 | 3 |
| 2 | 3 |
| 3 | 6 |
| 4 | 3 |
| 5 | 4 |
| 6 | 2 |
| 7 | 3 |
| 8 | 2 |
| 9 | 0 |

~120

| 0 | 0 |
| 1 | 0 |
| 2 | 3 |
| 3 | 6 |
| 4 | 12 |
| 5 | 15 |
| 6 | 19 |
| 7 | 21 |
| 8 | 24 |
| 9 | 26 |

| | |
|---|---|
| 0 | |
| 1 | |
| 2 | |
| 3 | |
| 4 | |
| 5 | |
| 6 | <u>25</u> |
| 7 | |
| 8 | |
| 9 | |
| 10 | |
| 11 | |
| 12 | 17 |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |

| | a | b1 | c1 | b2 | c2 | b3 | c3 |
|---|---|---|---|---|---|---|---|
| 0 | 2 | 4 | 17 | <u>3</u> | <u>25</u> | | |
| 1 | 1 | 7 | 18 | | | | |
| 2 | 3 | 8 | 4 | 7 | 11 | 5 | 14 |
| 3 | 3 | 2 | 0 | 6 | 21 | 3 | 22 |
| 4 | 3 | 3 | 19 | 3 | 23 | 5 | 24 |
| 5 | 2 | 3 | 5 | 5 | 8 | | |
| 6 | 3 | 1 | 2 | 4 | 3 | 3 | 7 |
| 7 | 3 | 1 | 1 | 7 | 6 | 1 | 12 |
| 8 | 3 | 2 | 9 | 6 | 16 | 5 | 20 |
| 9 | 3 | 4 | 10 | 8 | 13 | 2 | 15 |

| | | |
|---|---|---|
| 0 | 0 | ~120 |
| 1 | 0 | |
| 2 | 3 | |
| 3 | <u>6</u> | |
| 4 | 13 | |
| 5 | 15 | |
| 6 | 19 | |
| 7 | 21 | |
| 8 | 24 | |
| 9 | 26 | |

| | | |
|---|---|---|
| 0 | 0 | ~120' |
| 1 | 0 | |
| 2 | 3 | |
| 3 | <u>7</u> | |
| 4 | 13 | |
| 5 | 15 | |
| 6 | 19 | |
| 7 | 21 | |
| 8 | 24 | |
| 9 | 26 | | a b1  c1  b2  c2

METHOD AND SYSTEM FOR SORTING POLYGON DATA ACCORDING TO DEPTH VALUES

BACKGROUND OF THE INVENTION

1. Field of the Invention

The present invention relates to a polygon data sorting method, and a polygon data sorting system therefor. In particular, the present invention pertains to a polygon data sorting method, for a three-dimensional polygon computer graphic (CG) system, whereby a plurality of polygons are displayed by using depth values for the polygons, and to a polygon data sorting system therefor.

2. Related Arts

The sorting of polygon data is required in order to perform the removal of hidden surface in a three-dimensional polygon CG system, i.e., to remove hidden polygonal surfaces in consonance with a display priority when polygons are superimposed on a display device.

One of the methods employed for displaying polygons involves the use depth values (Z values) to determine the order in which the polygons are displayed. With this method, rearrangement of the polygon data must be performed in consonance with the depth values.

FIGS. 1, 2 and 3 are diagrams for explaining the rearrangement of polygons. In FIG. 1 example polygon data are shown. This polygon has three-dimensional coordinate points P0, P1 and P2 and a representative point Pr for these three points. The point Pr is acquired as the average value for the other three points.

The representative Z value for the point Pr is the average value obtained for the depth values of the polygon, and generally, polygon sorting is performed by using the representative Z value. FIG. 2 is a diagram for explaining this process. Assuming that polygons C, B and A are input in the order of registration, and that their representative Z values are 16, 17 and 23, the polygons are sorted and rearranged in the descending order of their representative values. As a result, the polygons are output in the order of A, B and C.

FIG. 3 is a diagram showing example polygons that are sorted and rearranged described in the descending order of their representative Z values. In FIG. 3, a plurality of polygons A, B, C, D, . . . and N are arranged in consonance with distances (representative Z values Z1, Z2, . . . and Zn) in the direction of the depth relative to the Z axis of the three-dimensional coordinates. The polygons are displayed in order as they are arranged in this manner.

Various methods, such as the one described above, have been proposed for rearranging polygon data. One method, called a quick sorting method, takes into account the fact that sorting can be performed fast by using hardware.

According to the quick sorting method, however, a problem has arisen in that the overhead for a data transfer circuit is increased because of the need for frequent data exchanges between memory areas. An additional problem that has arisen is that execution speeds vary greatly, depending on the changes in the representative Z values.

Another method that more effectively performs the exchange of data is a distribution method. This method, however, requires a greater memory capacity.

SUMMARY OF THE INVENTION

It is, therefore, one object of the present invention to provide a polygon data sorting method and a polygon data sorting system therefor that together resolve problems arising from the above shortcomings of a conventional polygon data sorting method.

It is another object of the present invention to provide a polygon data sorting method and a polygon data sorting system therefor wherein the required memory capacity is not affected by changes in target data, and wherein the execution speeds vary less.

It is an additional object of the present invention to provide a polygon data sorting method and a polygon data sorting system therefor wherein the exchange of data with a memory area is performed less frequently.

To achieve the above objects, according to the basic structure of a polygon data sorting method of the present invention, a plurality of sets of polygon data stored in an arbitrary order are sorted in a direction in which specific reference values are incremented, or in a direction in which the specific reference values are decreased, and are rearranged using the order of the reference values as the arrangement standard.

The reference values for the plurality of polygon data sets are divided into upper digit parts and lower digit parts. The divided upper digit parts are registered in an ascending order or a descending order. Subsequently, the values for the upper digit parts, the values for the lower digit parts corresponding to the upper digit parts and index numbers indicating the address position for the polygon data having the values for the upper digit parts are stored and registered. The polygon data that are registered in the order of the index numbers corresponding to an ascending order or a descending order of the registered values for the upper digit parts may then be read out.

Other objects of the present invention will become obvious during the course of the following explanation of the preferred embodiment of the present invention.

BRIEF DESCRIPTION OF THE DRAWINGS

FIG. 7 is a diagram for explaining the input of polygon data;

FIGS. 8A and 8B are diagrams for explaining the rewriting of the upper data buffer;

FIGS. 13A, 13B and 13C are diagrams for explaining the processing when data already exist in a corresponding lower data buffer;

FIGS. 14A, 14B and 14C are diagrams for explaining the processing when a corresponding lower data buffer is full;

FIGS. 15A, 15B and 15C are diagrams for explaining the processing when a corresponding lower data buffer is full and no empty space is available;

FIGS. 17A, 17B, 17C and 17D are diagrams for explaining the processing for constructing a sorting index;

FIGS. 18A, 18B, 18C and 18D are diagrams for explaining the processing, continued from FIGS. 17, 17B, 17C and 17D, for constructing a sorting index;

DETAILED DESCRIPTION OF THE PREFERRED EMBODIMENT

Figure 1:
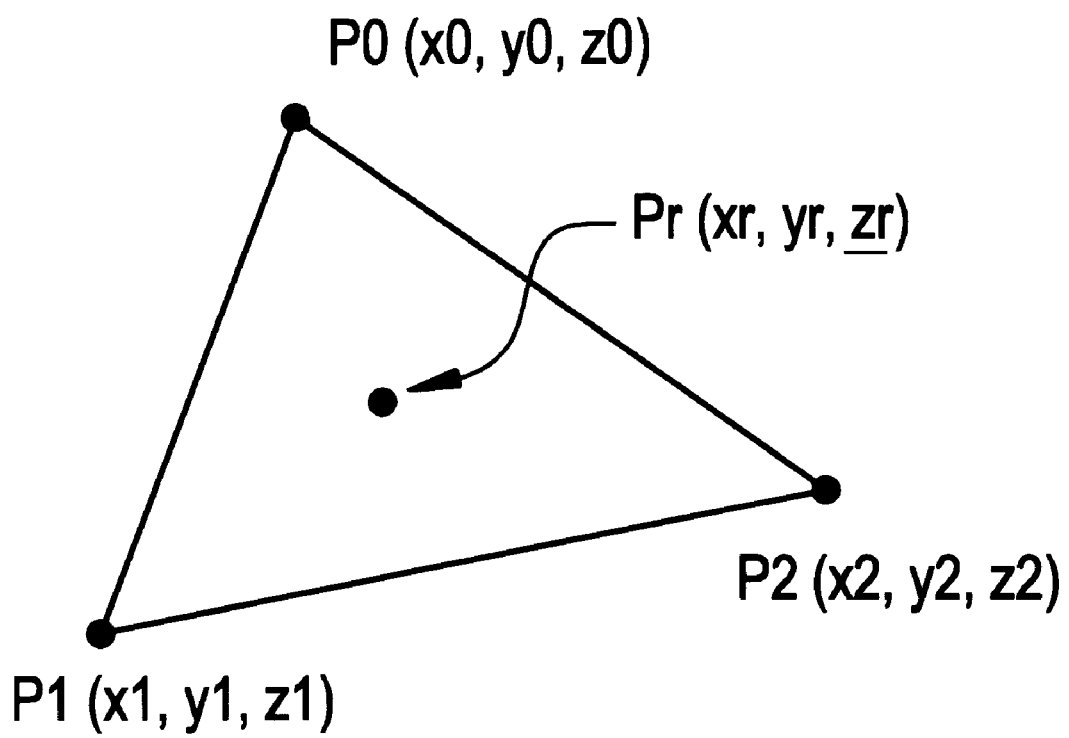
FIG. 1 is a diagram for explaining example polygon data.
Figure 2:
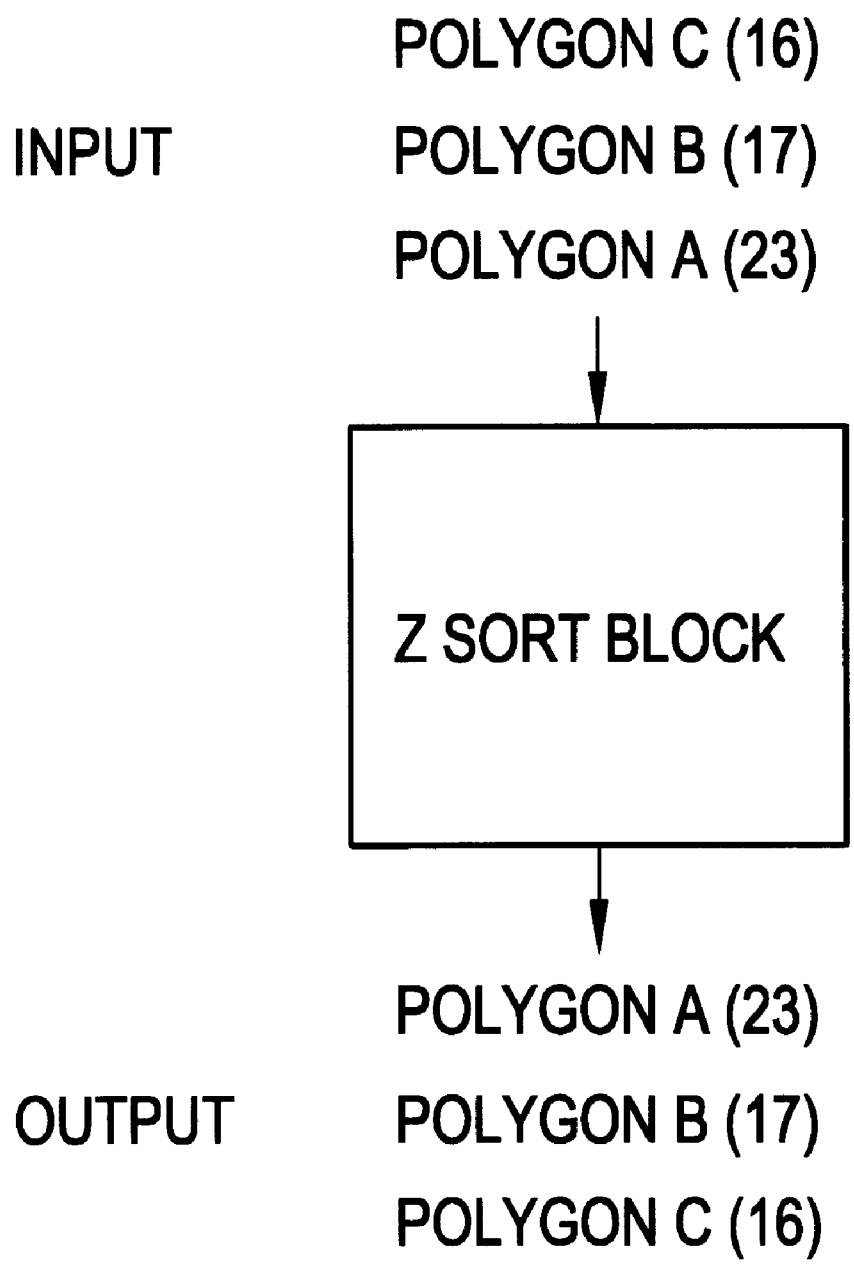
FIG. 2 is a diagram for explaining sorting of polygon data.

One embodiment of the present invention will now be described while referring to the accompanying drawings. The same reference numerals are used throughout to denote corresponding or identical components.

Figure 4:
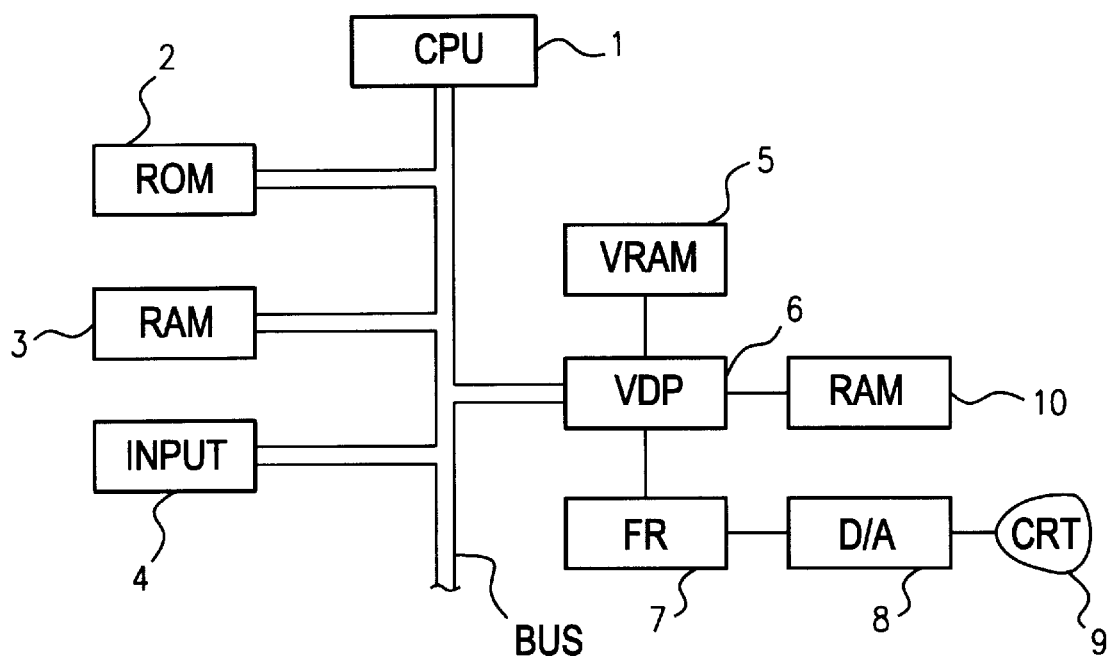
FIG. 4 is a block diagram illustrating an example configuration of a video game machine according to one embodiment of the present invention.

FIG. 4 is a block diagram illustrating an example configuration of a video game machine according to one embodiment of the present invention. A ROM 2, a work RAM 3, a video display processor 6 and an input device 4 are connected to a CPU 1 via a bus BUS.

The CPU 1 executes a program stored in the ROM 2. Sorting of polygon data in this invention is also controlled by the program stored in the ROM 2.

The work RAM 3 is used to store data that are being processed during a game. The input device 4 is a joystick pad, etc., and is operated by a game player while inputting data required, for example, to move a character (hereinafter referred to as a sprite) on a display.

The video RAM 5 is used in this invention to store sorted polygon data. All polygon data stored in the video RAM 5 have (Xi, Yi, Zi) coordinate data and color data for each of a plurality of polygon vertices to be displayed.

The video display processor (VDP) 6 includes a digital signal processor (DSP). The video RAM 5, the sorting RAM 10 and a frame buffer memory (FB) 7 are connected to the video display processor (VDP) 6.

The VDP 6, which is activated in consonance with a frame switching timing, processes polygon data stored in the video RAM 5 and draws pixel data for one screen in the frame buffer memory (FB) 7.

The frame buffer memory 7 has two memory screens. While pixel data for one screen that are drawn on one memory screen are sequentially read and displayed on a display device 9, pixel data for the next display screen are sequentially written to the other memory screen. Data for one screen stored in the frame buffer memory 7 are employed as data for individual pixels (dots).

A video signal generator 8 reads pixel (dot) digital data written and stored in the frame buffer memory 7, and converts it into analog video signals. Video signals are transmitted from the video signal generator 8 to the display device 9, such as a CRT, and are displayed thereon.

Figure 3:
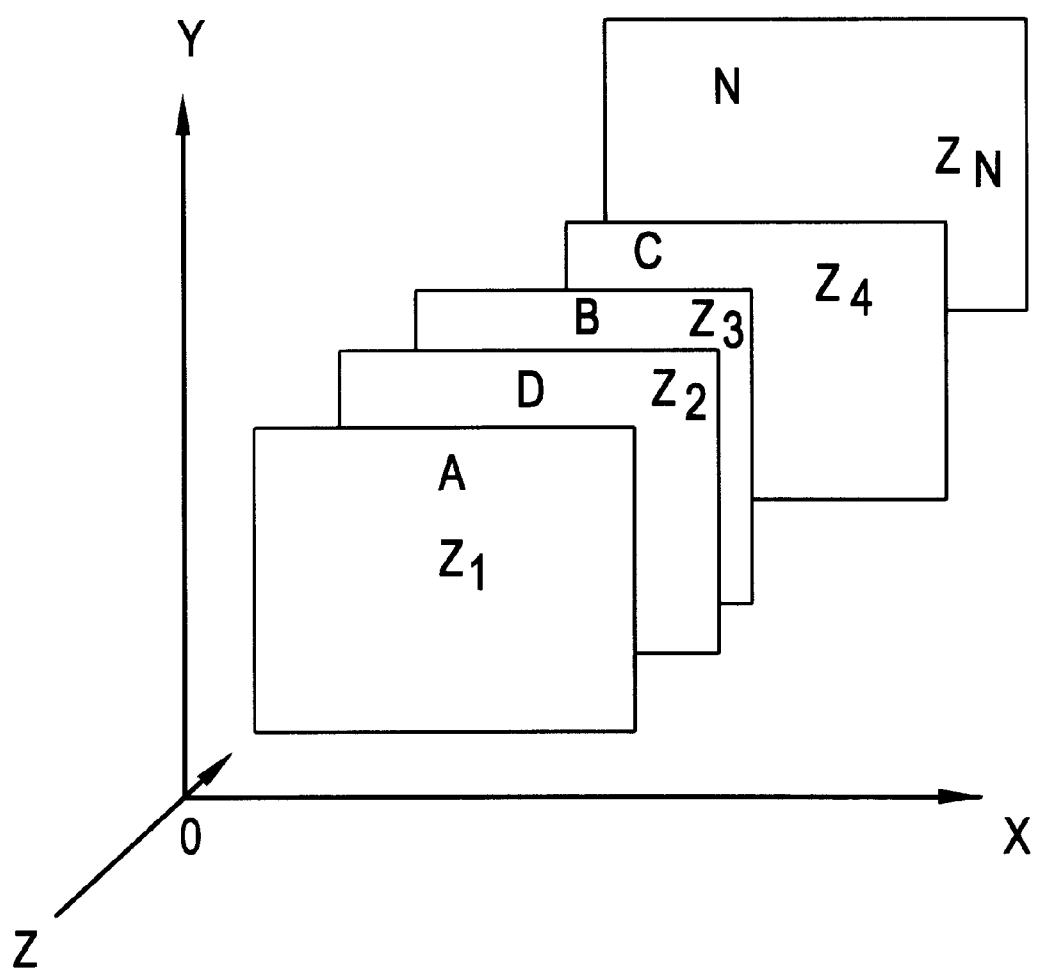
FIG. 3 is a diagram for explaining an example arrangement of sorted polygons.

When a plurality of polygons constituting one display screen are to be displayed on a two-dimensional display device 9, such as a CRT, in principle, polygons are superimposed in the frame buffer memory 7 beginning with the polygon furthest from the viewing point of a game player, as is described while referring to FIG. 3, for example. This function is called priority control, and is performed to prevent a polygon in the foreground from being masked by a polygon that is further distant in the direction of the depth of a screen.

It is therefore required that polygon data stored in the video RAM 5 be rearranged in consonance with perceived distances in the direction of the depth of a screen, e.g., in consonance with the representative Z values. That is, the sorting processing, which is the feature of the present invention, is required.

Figure 5:
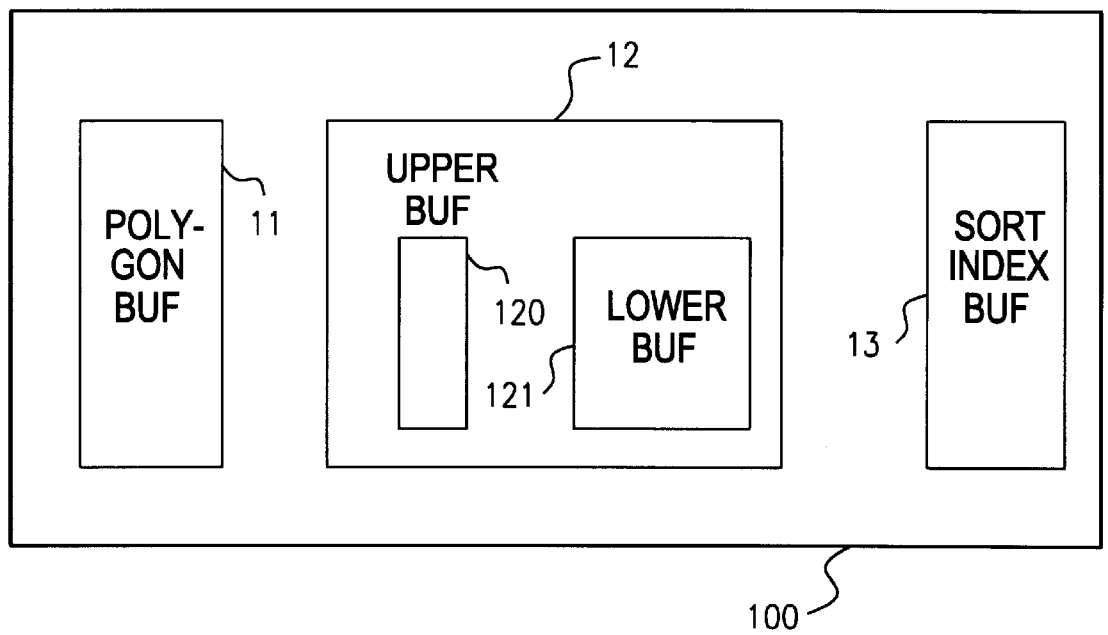
FIG. 5 is a diagram for explaining the structure of a Z sorting block that is employed for a buffer memory required for executing a sorting method according to the present invention.

FIG. 5 is a diagram for explaining a Z sorting block 100 that constitutes the structure of a buffer memory required for executing the sorting method of the present invention. An area for a buffer memory constituting the Z sorting block 100 is provided, for example, in the work RAM 10 of FIG. 4 that is connected to the RAM 3 and the VDP 6.

Referring to FIG. 4, as a game program progresses, polygon data are transmitted in response to commands from the CPU 1 to the DSP included in the VDP 6. The DSP included in the VDP 6 transforms the coordinates for the polygon data in accordance with the commands. For example, the DSP included in the VDP 6 transforms world coordinates for polygon data into three-dimensional coordinates, as is shown in FIG. 1.

The polygon data for three dimensional coordinates obtained by the DSP included in the VDP 6 are stored for individual polygons in a polygon buffer 11, as in FIG. 5, in the order of coordinate transformation. While a sorting buffer 12 includes an upper data buffer 120 and a lower data buffer 121.

Figure 6A:
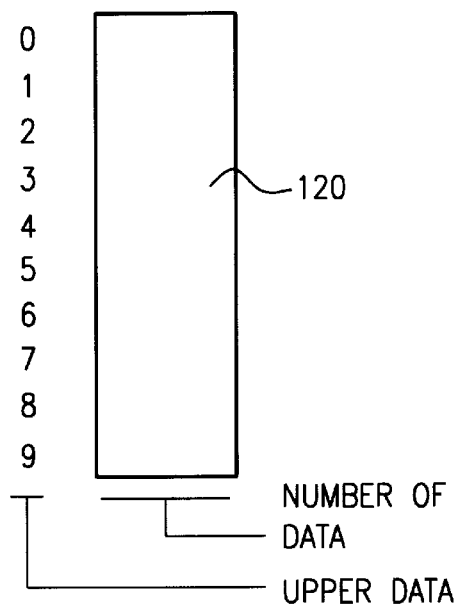
FIGS. 6A and 6B are detailed diagrams illustrating an upper data buffer and a lower data buffer.
Figure 6B:
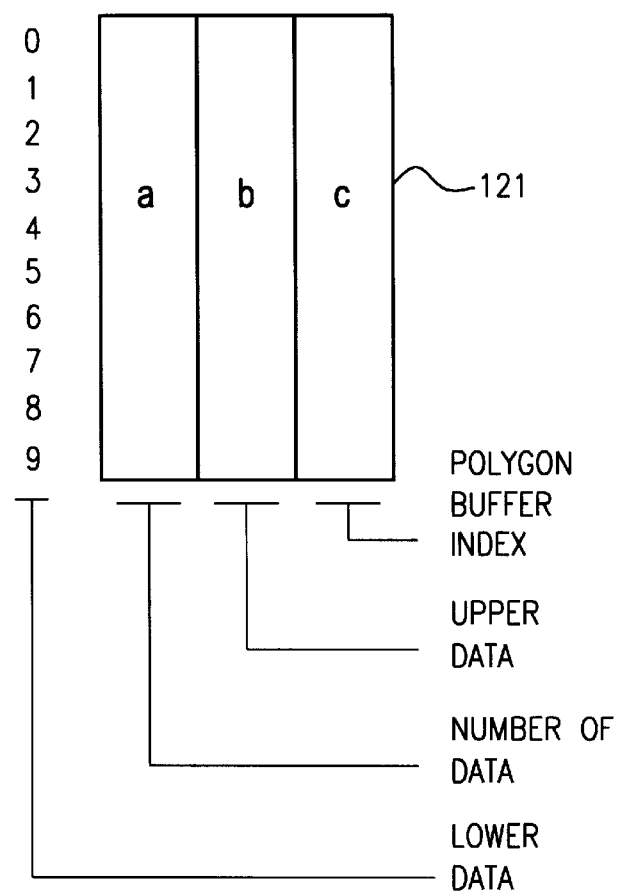

The upper data buffer 120 and the lower data buffer 121 are respectively shown in FIGS. 6A and 6B. As shown in the Figures, each number corresponding to the polygon data stored in the polygon buffer 11 is represented by a decimal number of two figures. As shown in FIG. 6A, the upper data buffer 120 stores the number of polygons having upper digit numbers, i.e., of the second digit, which correspond to numeral 0 through 9 respectively.

In FIG. 6B, the lower data buffer 121 stores the number of polygons having lower digit numbers, i.e., the first digit, corresponding to numerals 0 through 9 in the numbered data represented by a in FIG. 6B. The numbers of the upper digits which correspond to the lower digits 0 through 9 respectively are stored in the upper data index b as shown in FIG. 6B. The index numbers from the stored index buffer 13 which correspond to the respective polygons are stored in a polygon index buffer c of the lower data buffer 121 as shown in FIG. 6B.

Figure 9:
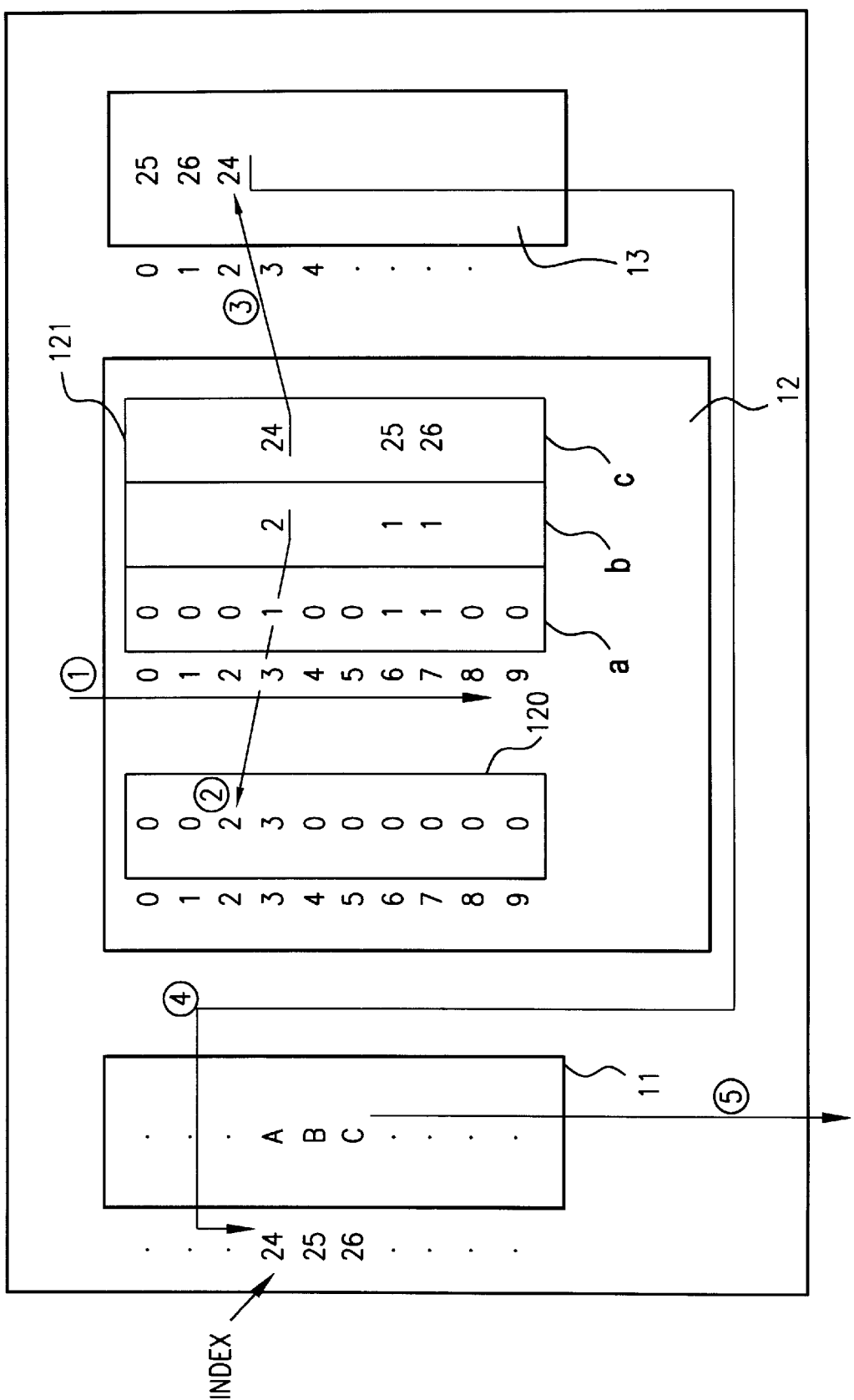
FIG. 9 is a diagram for explaining the output of polygon data.
Figure 10:
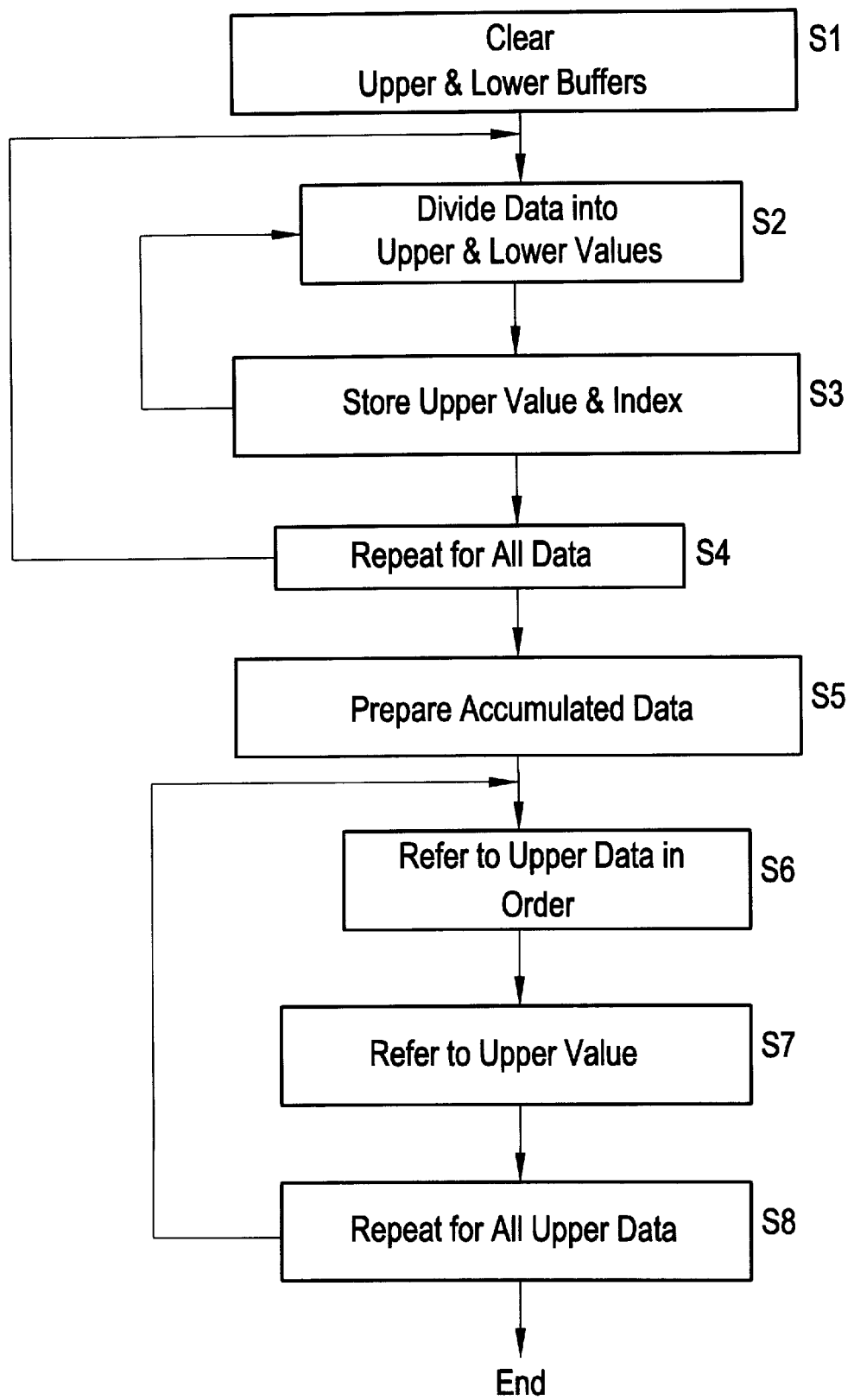
FIG. 10 is a schematic flowchart for sorting processing according to the present invention.

FIGS. 7 through 9 are diagrams for explaining the sorting processing performed with the structure of the Z sorting block 100 in FIG. 5. FIG. 10 is a schematic flowchart for the sorting processing.

The sorting processing will be briefly described while referring to the flowchart in FIG. 10, and then the upper data buffer and the lower data buffer for polygon data will be described in detail while referring to FIG. 7. Assume that polygon data A, B and C have the representative Z values 23, 16 and 17, respectively.

First, the areas in the upper data buffer 120 and the lower data buffer 121 of the sorting buffer 12 in FIG. 5, wherein the data set count is stored, are cleared (step S1; the following steps also refer to FIG. 10).

Coordinate transformation is performed for the three sets of polygon data A, B and C by the DSP included in the VDP 6, and the resultant polygon data are stored in the polygon buffer 11. Index numbers 24, 25 and 26 are provided as the storage ranks for the polygon data A, B and C.

The representative Z value for the polygon data that is to be input is divided into an upper value and a lower value (step S2).

The upper value and its index number are stored at an unused position in the lower data buffer 121 that corresponds to the lower value (step S3).

A corresponding data count is updated (incremented by one). The numeral (data count) in the upper data buffer 120 corresponding to the upper value is updated (incremented by one). If the corresponding lower data buffer 121 is full, the data count is incremented by one when the values of target data are to be arranged in the ascending order, while the data count is decremented by one when the data values are to be arranged in the descending order. This process is repeated for all the data (step S4).

The process will be described in detail while referring to FIG. 7. The data count for polygon data having the same numerals are recorded for each of the upper digits, 0 through 9, in the upper data buffer 120 of the sorting buffer 12. Only polygon data A has a 2 as the upper digit; polygon data B and C have a 1 as the upper digit.

Therefore, the area in the upper data buffer 120 corresponding to the numeral 1 for the upper digit is updated to 2, and the area corresponding to the numeral 2 for the upper digit is updated to 1. In the same manner, in the lower data buffer 121, the count for polygon data having lower-digit numerals is recorded for the lower digit in the area a for each of the corresponding numerals 0 through 9.

Since the numerals for the lower digits of the polygon data A, B and C are 3, 6 and 7, the counts for polygon data are updated to 1 in consonance with the corresponding lower-digit numerals, 3, 6 and 7 (see the column for area a of the lower data buffer 121).

At a position in area b of the lower data buffer 121, corresponding to that in area a in which at least polygon data count 1 is stored, is stored a numeral for the upper digit of polygon data having a corresponding lower digit numeral.

More specifically, since 2 is the numeral for the upper digit of polygon data having the numeral 3 for the lower digit, the value 2 is recorded in a corresponding column in area b. Similarly, since 1 is the numeral for the upper digits of the polygon data having values 6 and 7 for the lower digits, a value 1 is recorded in the corresponding columns in area b.

In area c in the lower data buffer 121 are stored index numbers for the polygon buffer 11 in which are stored polygon data, which have lower-digit numerals corresponding to a polygon data count of 1 or more stored in area a, and upper-digit numerals stored in area b.

This is the input processing for polygon data. The sorting operation based on input data will also be described now while referring to the flowchart in FIG. 10, and the output of polygon data will be described while referring to FIGS. 8 and 9.

When the job for storing the polygon data in the buffer has been completed, accumulated data are prepared based on the value in the upper data buffer 120 (step S5). When the values are arranged in the ascending order, the data values are accumulated beginning with a small value in the upper data buffer 120. When the values are arranged in the descending order, the data values are accumulated beginning with a large value in the upper data buffer 120. The accumulated value is shifted by one step, and is returned to the original buffer area.

More specifically, as is shown in FIG. 8A, the data are added beginning with a small data value for the upper digit in the upper data buffer 120, and the resultant value is shifted by one step. Such a calculation is performed by the DSP included in the VDP 6. That is, data [0210000000] stored in the upper data buffer 120 in FIG. 8A is added from the top, and the result is shifted one step. Thus, as is shown in FIG. 8B, [0023000000] is displayed for the updated upper data buffer 120'.

Following this, the upper digit data stored in area b in the lower data buffer 121 are referred to in order (step S6: ① in FIG. 9). When the data values are arranged in the ascending order, a small value is referred to first. When the data values are arranged in the descending order, a large value is referred to first. Further, when a plurality of upper data sets are stored in the same location in the lower data buffer 121, the data are referred to in the order in which they were stored.

The upper data buffer 120, which corresponds to the extracted upper data, is examined by referring to the upper digit data (step S7: ② in FIG. 9). These values correspond to the data order after sorting has been performed. The index values in the polygon buffer 11 are stored in positions that correspond to those in the sorting index buffer 13 (③ in FIG. 9). In the example in FIG. 9, index 24 is stored at the position for order 2 in the sorting index buffer 13.

The above described output processing is continued until all the upper data stored in the lower data buffer 121 are referred to (step S8). As a result, as is shown in FIG. 9, the reading rankings for all the polygons are stored in the sorting index buffer 13. Thus, the order for the polygon data is determined by referring to all the upper data.

Therefore, the indexes are read in the order in which they are stored in the sorting index buffer 13, and polygon data can be read in the sorting order from corresponding index number positions ((④ in FIG. 9) of the sorting index buffer 11 (⑤ in FIG. 9).

Figures 11A, 11B, 11C:
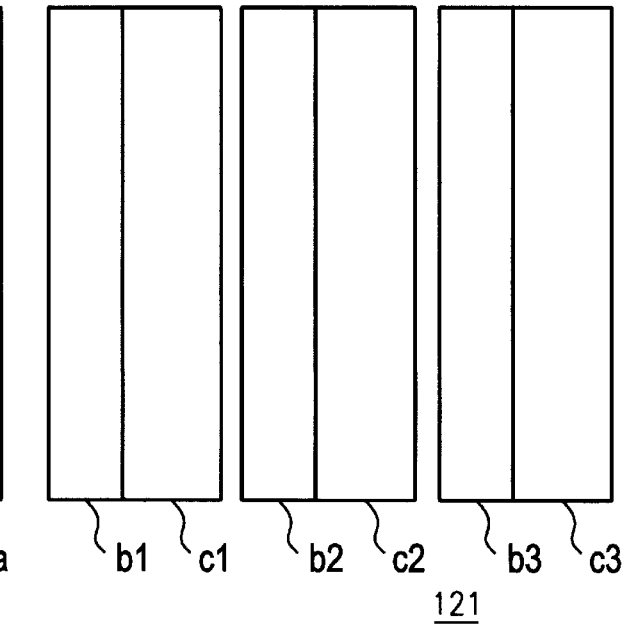
FIGS. 11A, 11B and 11C are diagrams for explaining the initialization of a data buffer.

In FIGS. 11A through 18D are shown examples that correspond to the polygon data sorting method of the present invention. In these examples, there are 26 types of polygon data, A through Z. Thus, the polygon data A through Z are stored in the polygon buffer 11 as they are registered (FIG. 11A). As an explanation for this example, the representative Z values for the polygon data A through Z are shown in parenthesis in the polygon buffers 11 shown in FIGS. 11 through 18. Actually, the polygon data have (X, Y, Z) coordinates and a color code, and their representative values are acquired by calculation.

As is shown in FIG. 11B, for the lower data buffer 121 are prepared a buffer a, for storing data counts, and three sets of buffers b and c, (b1, c1), (b2, c2) and (b3, c3), for storing upper data and corresponding index numbers.

The above relationship can be applied to FIGS. 12A through 18D.

Referring back to FIGS. 11A through 11C, the buffers are cleared in the initial state. Then, as is shown in FIG. 12A, representative Z value (23) for polygon data A is registered.

More specifically, in consonance with the decimal numeration system, a representative Z value is divided into two numerals, with the upper data being regarded as the first numerical digit and the lower data being regarded as the second numerical digit. In FIG. 12A, the upper digit data for polygon data, which is positioned at index number 0 in the polygon buffer 11, is "2," and its lower digit data is "3."

Figures 12A, 12B, 12C:
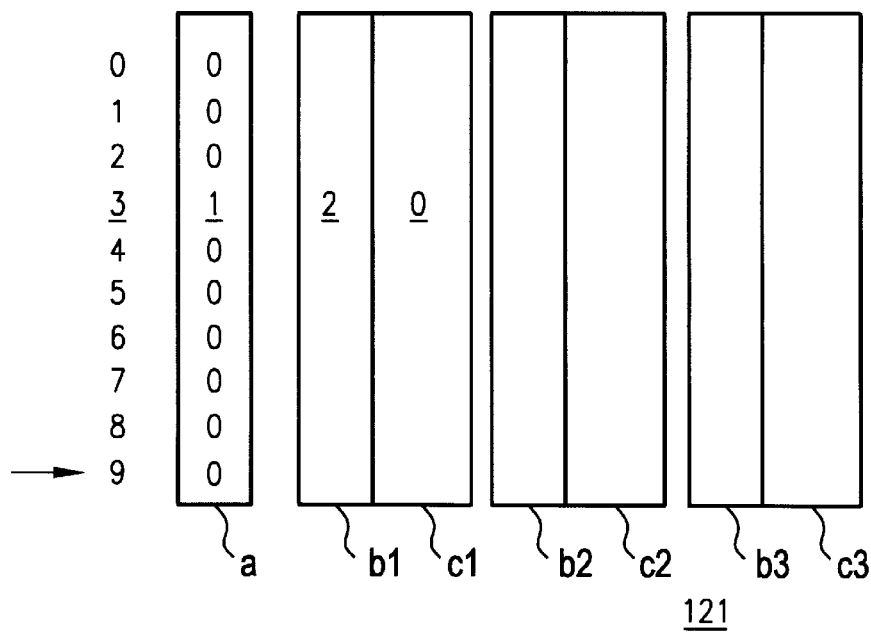
FIGS. 12A, 12B and 12C are diagrams for explaining registration of a representative Z value for polygon data A.

Thus, a "1" is set at the position corresponding to the upper digital data value 2 for the upper data buffer 120 (FIG. 12C). Similarly, a "1" is set in the position corresponding to the lower data value 3 for the data count buffer a in the lower data buffer 121 (FIG. 12B).

In addition, index number 0 at which the representative Z value (23) are stored and the upper data value 2 are set in the first buffer set (b1) and (c1) which corresponds to the data count buffer a for which a "1" is set, of the lower data buffer 121.

FIGS. 13A through 13B are diagrams for explaining the processing for continuing the registration of representative Z values for polygon data, and for registering the representative Z value for polygon data that is registered at the position for index number 3. In this example, data is already present in the lower data buffer 121.

The upper data value for polygon data D is 4 and the lower data value is 6. Before the upper data value 4 and the corresponding index number 3 that corresponds to the lower data value 6 are registered, data were registered in the first set (b1, c1) of the lower data buffer 121. In this case, upper data 4 and index number 3 are shifted and registered in the second set (b2, c2).

As is shown in FIG. 13B, when data are already preset in the lower data buffer 121, new data are shifted and registered in the next set. In this example, although the buffer areas are prepared up to the third set (b3, c3), when data are set in the third set (b3, c3), data can not be shifted to the next set.

FIGS. 14A through 14C are diagrams for explaining the processing in the above case. When polygon data value M (representative Z value 17) at index number 12 in the polygon buffer 11 is to be registered, the lower data value is 7 and three sets of data are already registered in the corresponding lower data buffer 121. Thus, the lower data value 7 can not be shifted to the next set.

As is shown in FIG. 14B, therefore, the lower data value 7 is registered in the following lower data buffer column in the lower data buffer 121. That is, since the second set (b2, c2) and the following set that correspond to lower data value 8 are unused, values 1 and 12 are registered in the second set (b2, c2). The following lower data buffer column, which corresponds to lower data value 8, is selected when the data are sorted in the ascending order. When the data are sorted in the descending order, the data buffer column is shifted to a position immediately above the unused lower data buffer column.

Figures 15A, 15B, 15C:
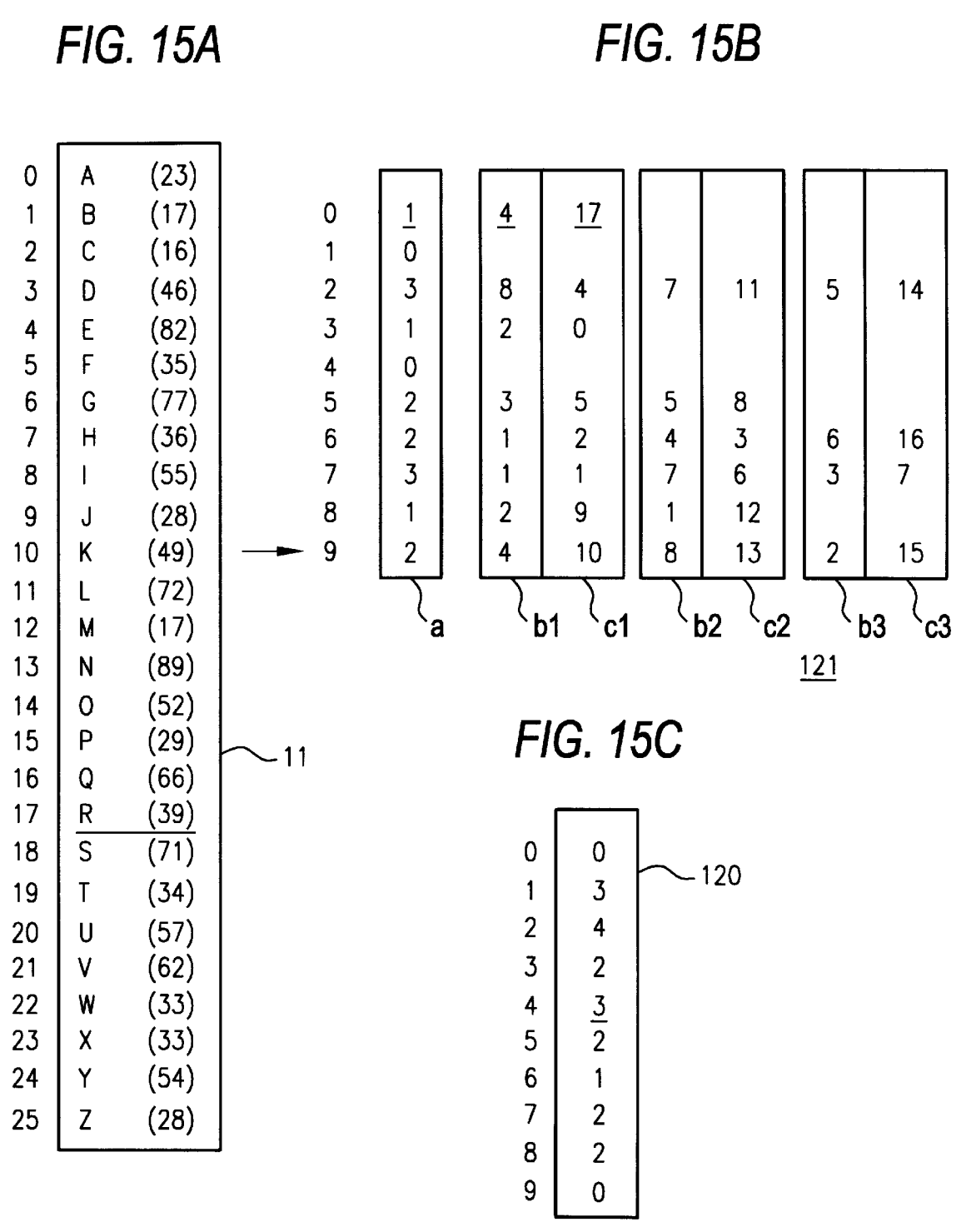

FIGS. 15A through 15C are diagrams for explaining the processing in FIG. 14 when there is no unused lower data buffer column in the downward direction. Assume that polygon data value R at index number 17 in the polygon buffer 11 is to be registered. The lower data value is 9 and there is no empty area in the lower data buffer 121 corresponding to the value 9.

In this case, therefore according to the present invention the upper data values are carried over and registered in unused positions. In other words, in this example, a representative Z value is carried from 39 to 40, and a carried value 4 is also used for the upper data buffer 120 (see FIG. 15C).

As a result, as is shown in FIG. 15B, value 1 is registered in buffer a at a position corresponding to lower data value 0, and values 4 and 17 are registered in the first set (b1, c1).

When the representative Z values for all polygon data have been registered, the resultant condition of the polygon buffer 11 is as is shown in FIGS. 16A through 16D.

An explanation will now be given for the processing for reading polygon data in the sorting order based on the registered representative Z values.

Figures 16A, 16B, 16C, 16D:
FIGS. 16A, 16B, 16C and 16D are diagrams for explaining the condition where all polygon data have been registered.

In FIG. 16C, values that are registered in the upper data buffer 120 are consequently added. The result is shifted by one step, and is written again in the upper data buffer 120. The updated upper data buffer 120' is shown in FIG. 16D.

Figures 17A, 17B, 17C, 17D:
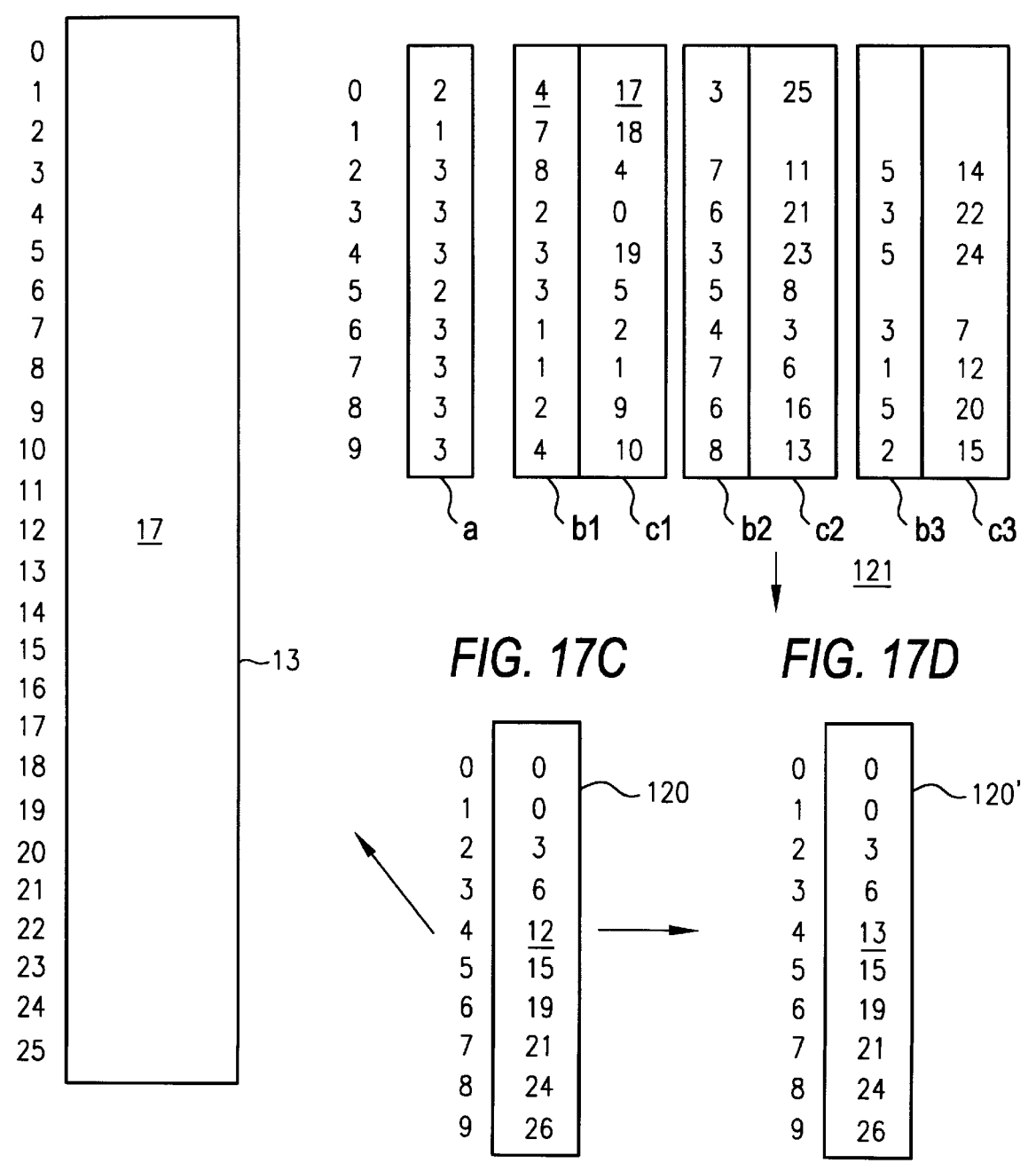

The processing for forming a sorting index will be described while referring to FIGS. 17A through 17D. When polygon data are to be arranged in the order beginning with the smallest representative Z value, the upper data and a corresponding index number are acquired in the order beginning at the smallest lower data value in the lower data buffer 121. In FIG. 17B, first, upper data 4 and index number 17 in the first set (b1, c1) at a position corresponding to the lower data value 0 are identified.

Based on upper data value 4, and by referring to the upper data buffer 120, sort order number 12 is identified (FIG. 17C). At this time, a new sorting index buffer 13 is prepared (FIG. 17A). Therefore, index number 17 for the data buffer 11 is recorded at the position for sorting order number 12 that has been identified. In addition, the sorting number identified in the upper data buffer 120 is incremented by one, providing the upper data buffer 120' (FIG. 17D).

Similarly, in FIGS. 18A through 18D are shown the processing for identifying upper data 3 and index number 25 in the second set (b2, c2) that follows the first set (b1, c1) in the lower data buffer 121, at the position corresponding to lower data value 0.

Based on upper data value 3, sort number 6 in the upper data buffer 120 is identified (FIG. 18C). The upper data buffer 120 is incremented by one, providing the updated upper data buffer 120' (FIG. 18D). Also, index number 25 in the data buffer 11 is recorded at a position corresponding to sorting number 6 in the sorting index buffer 13 (FIG. 18A).

In the above described manner, all the index numbers in the polygon data buffer 11 have been written in the sorting index buffer 13. The index number in the polygon data buffer 11 that corresponds to the sorting number in the sorting index buffer 13 is acquired, and polygon data are read in the ascending order of the representative Z values or in the descending order.

The memory capacities required by the method of the present invention for the upper data buffer 120 and the lower data buffer 121 will now be described.

Consider a memory capacity that is required when data to be sorted are 16-bit integer data, and the set data count for a polygon to be processed is 5,000 at the maximum. According to the method of the present invention, polygon data are divided into upper bits and lower bits.

The upper bits serve to ensure the accuracy of the lower limit. When more bits are allocated as upper bits, the accuracy is increased, even though the execution speed is reduced and a larger memory capacity is required. When more bits are allocated as lower bits, the memory capacity requirement can be reduced, but when many of the same values appear, an overhead occurs that causes an error. Thus, an appropriate division ratio is important.

Figure 19:
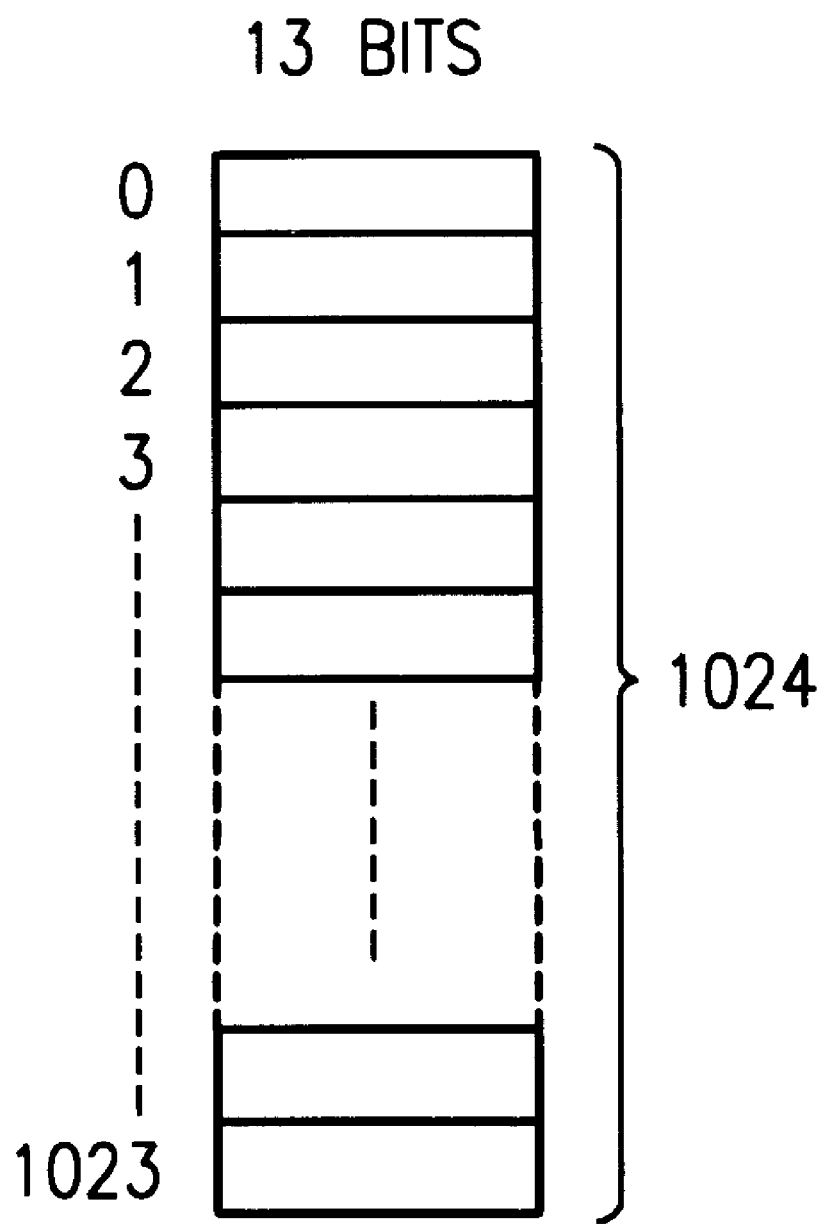
FIG. 19 is a diagram showing the memory structure used for explaining the capacity of an upper data buffer.

A memory structure obtained by a ratio of 10 upper bits to 6 lower bits will be explained. As is shown in FIG. 19, the number of stored data sets is recorded at 1024 positions in the 10 upper bit buffer memory 120 that corresponds to the 10 upper bits. Since the count value is 5,000 at the maximum, the size of each buffer is 13 bits.

The upper bits and the index data are stored in the lower bit buffer 121, which is constituted by buffers b and c and buffer a in which a data count is stored. All the values of the data to be processed are stored in the buffers b and c, in which the upper bits and the index data are stored.

Figure 20A:
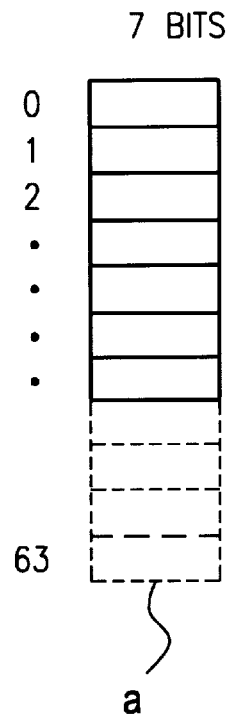
FIGS. 20A and 20B are diagrams showing the memory structure used for explaining the capacity of a lower data buffer.
Figure 20B:
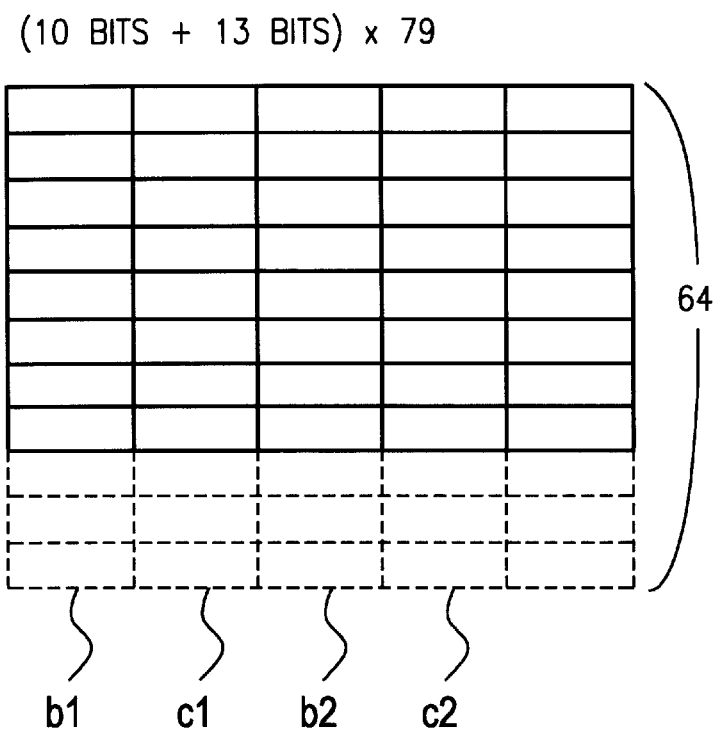

Since the number of data sets is 5,000, as is described above, a minimum of 79 steps ($5,000 \div 64 \approx 78.1$) are required, as is shown in FIGS. 20A & 20B. The buffer size requires 23 bits in total; 10 bits (buffer b) for representing the upper bits and 13 bits (buffer c) for representing index data.

The buffer a in which the data count is stored requires 7 bits because the count value is 79 at the maximum. If many bits are provided for the upper bit buffer b and the index data buffer c, it is hard for an error to occur.

The necessary memory capacities are determined in this manner in advance, and these capacities do not vary in consonance with data changes. When a sufficient number of bits are provided for the lower data buffer 121, the likelihood of the occurrence of an overhead due to the appearance of many data sets can be reduced.

As is described above in the embodiment, it is apparent that the present invention can provide the following characteristic effects. First, a required memory capacity is not affected by variations in target data. Second, so long as there is no excessive concentration of target data values, an error relative to lower data will also not occur.

Third, since the memory capacity is determined while taking the maximum value of target data into account, very little unnecessary memory is acquired, and data exchanges with memory areas is performed much less frequently. And when a variance in data is anticipated, an appropriate distribution of memory can be effected. Fourth, the ratio of the priority for memory efficiency to the priority for a speed can be adjusted.

The above embodiment, with the drawings, has been employed as an example to describe the present invention, but the present invention is not limited to that which has been disclosed.

The scope of the present invention is as defined in the claims, and the equivalent to the claimed invention comes within the scope of the coverage afforded by the present invention.

What is claimed is:

1. A polygon data sorting method for sorting a plurality of sets of polygon data stored in a polygon buffer in an arbitrary order, in a direction in which specific reference values are increased or in a direction in which said specific reference values are decreased, comprising the steps of:

dividing said specific reference values of said plurality of polygon data sets into upper digits and lower digits;

registering the number of sets of polygon data having an upper digit of a reference value for each set of polygon data in an upper data buffer;

registering in a lower data buffer the number of sets of polygon data having said upper digit corresponding to each of the lower digits, values for said upper digits of polygon data having said values for said lower digit, and index numbers indicating positions in the polygon buffer memory where the polygon data having said values for said upper digits are stored; and reading said polygon data that are registered in said polygon buffer in order represented by said index numbers where one set of said index numbers correspond to au ascending order or another set of said index numbers correspond to a descending order of said values for said upper digits that are registered in said upper data buffer.

2. The polygon data sorting method according to claim 1, wherein said specific reference values for said plurality of sets of polygon data are representative values obtained from Z axial coordinate values for three-dimensional coordinates of vertices that form said polygon data.

3. The polygon data sorting method according to claim 2, wherein said representative values are average values for said Z axial coordinate values for three-dimensional coordinates of vertices that form said polygon data.

4. A polygon data sorting system comprising:

a polygon buffer storing a plurality of sets of polygon data in an arbitrary order;

an upper data buffer registering the number of sets of polygon data having an upper digit of a reference value for each set of polygon data, which are divided into upper digits and lower digits;

a lower data buffer having a first area for registering the number of polygon data having the upper digit corresponding to each value for said lower digit, a second area for registering a value for said upper digit of polygon data having said value for said lower digit for which the number of said polygon data is registered in said first area, and a third area for registering an index number indicating a position in said polygon buffer where said value for said upper digit of polygon data registered in said second area is stored; and a sorting index buffer for storing said index number indicating said position in said polygon buffer at which polygon data are stored in the order in which said polygon data are read sequentially from said polygon buffer.

5. The polygon data sorting system according to claim 4, wherein the number of said polygon data registered in said upper data buffer is accumulated and the result is shifted by one step and stored again in said upper data buffer; wherein said index numbers registered in said third area are registered in said sorting index buffer in an order designated by registered polygon data values in said upper data buffer that are again stored to correspond with said values for said upper digit of said polygon data, which has said lower digit value for which said polygon data is registered in said first area and which is registered in said second area; and wherein from said polygon buffer are read said polygon data, which correspond to said registered index numbers, in an order in which said index numbers have been registered in said sorting index buffer.

6. The polygon data sorting system according to claim 4, wherein said lower data buffer is allocated a plurality of sets of said second and said third areas relative to said first area, and wherein as said data count for polygon data to be registered in said upper data buffer is increased, data registration is performed in order for said plurality of sets of said second and said third areas.

7. The polygon data sorting system according to claim 6, wherein when said data count for polygon data to be registered in said upper data buffer is equal to or greater than said plurality of sets of said second and said third areas in said lower data buffer, said polygon data are registered in said second and said third areas that correspond to a value for a lower digit that is greater or less than a value for a lower digit corresponding to said first area in said lower data buffer.

8. An image processing apparatus comprising:

a buffer for storing a plurality of sets of polygon data in an arbitrary order, a controller for sorting said plurality of sets of polygon data in a direction in which said specific reference values are increased by employing one set of said specific reference values as an arrangement standard or decreased by employing another set of said specific reference values as an arrangement standard, and a display device for displaying, in a rearranged order, said plurality of sets of polygon data that are rearranged by said controller, wherein said controller divides said reference values of said plurality of polygon data sets into upper digits and lower digits, registers and stores the number of sets of polygon data having an upper digit of a reference value for each set of polygon data in an upper data buffer, registers the number of sets of polygon data having said upper digit corresponding to each of lower digits, and index numbers indicating positions in which are stored in the polygon buffer memory, polygon data having said values for said upper digits, in a lower data buffer, and reads said polygon data that are registered in said polygon buffer in order represented by said index numbers that correspond to said increasing order or those of said index numbers that correspond to said decreasing order of said values for said upper digits that are registered in said upper data buffer.

9. The image processing apparatus according to claim 8, further comprising:

a memory for storing a game program, and a CPU for executing said game program, wherein said control by said controller is begun by said CPU executing said game program.

* * * * *